US008658105B2

(12) United States Patent
Daf

(10) Patent No.: US 8,658,105 B2

(45) Date of Patent: Feb. 25, 2014

(54) APPARATUS FOR SECURELY PROCESSING BIOLOGICAL SAMPLE

(75) Inventor: David Daf, Taipei (TW)

(73) Assignee: Taigen Bioscience Corporation, Taipei (TW)

( * ) Notice: Subject to any disclaimer, the term of this patent is extended or adjusted under 35 U.S.C. 154(b) by 0 days.

(21) Appl. No.: 13/472,191

(22) Filed: May 15, 2012

(65) Prior Publication Data

US 2012/0294778 A1 Nov. 22, 2012

(30) Foreign Application Priority Data

May 18, 2011 (TW) ............................ 100117468 A

(51) Int. Cl.
*B01D 11/02* (2006.01)
*E03B 11/00* (2006.01)
*B01D 24/00* (2006.01)

(52) U.S. Cl.
USPC ............................ 422/261; 137/268; 210/282

(58) Field of Classification Search
USPC ............................ 422/261; 137/268; 210/282
See application file for complete search history.

(56) References Cited

U.S. PATENT DOCUMENTS

2006/0177354 A1 8/2006 Daf

FOREIGN PATENT DOCUMENTS

TW I253957 5/2006

*Primary Examiner* — Monzer R Chorbaji

(74) *Attorney, Agent, or Firm* — Hamre, Schumann, Mueller & Larson, P.C.

(57) ABSTRACT

An apparatus for securely processing biological sample is used to wash, separate, or purify biological molecules, such as DNAs, RNAs, and proteins. The apparatus comprises at least one semi-permeable membrane column, a vacuum manifold, and at least one optional adaptor column. The semi-permeable membrane column is loosely received in the slot of the vacuum manifold. When the adaptor column is used, the semi-permeable membrane column is loosely received in the adaptor column, and the adaptor column is loosely received in the slot of the vacuum manifold. The apparatus also comprises sealing elements which are inserted between the column and the slot. When the semi-permeable membrane column contains liquid sample and vacuum is applied to the vacuum manifold, the liquid in the semi-permeable membrane column can be drawn out of the column through the membrane.

1 Claim, 5 Drawing Sheets

APPARATUS FOR SECURELY PROCESSING BIOLOGICAL SAMPLE

FIELD OF INVENTION

The present invention is related to an apparatus for securely processing biological sample.

BACKGROUND OF THE INVENTION

Liquid semi-permeable membrane columns (or semi-permeable membrane columns) are commonly used in laboratory for washing, separating, or purifying biological molecules, such as DNA, RNA, and proteins. Semi-permeable membrane columns that are commonly used are mostly cylindrical in shape, whereby the bottom is provided with one or more pieces of semi-permeable membranes of special purposes. The column is infused with liquid, and an adequate force is then applied to the liquid in the column, forcing the liquid out of the column through the semi-permeable membranes.

Normally, the applied force can be a centrifugal force or air pressure. When centrifugal force is used, the column is usually placed in a liquid collecting tube, and then the liquid is infused in the column. The liquid collecting tube and the column are then placed into a centrifuge. The centrifuge is turned on to spin at high speed to generate a high centrifugal force. The liquid in the column is forced out of the column through the semi-permeable membranes and collected in the liquid collecting tube. The above process is only suitable for a single column. When an operation involving numerous columns is needed, the process would become overly cumbersome as the capacity of a centrifuge is limited. When air pressure is employed as an applied force, numerous semi-permeable membrane columns can be inserted into a vacuum manifold, which has a greater capacity than a centrifuge. By applying a positive or negative air pressure, the liquid is forced out of the columns through the semi-permeable membranes and is collected in the vacuum manifold. The process of using air pressure is more convenient when operating numerous samples or continuous operations.

A conventional semi-permeable column 31 (see FIG. 1) generally comprises three parts: an upper cervical section 311, a middle tubular section 312, and a lower tapered section 313. The diameter of the upper cervical section 311 is larger than that of the middle tubular section 312. Some of the columns include a lid 314. The middle tubular section 312 is provided for containing liquid sample, and its internal bottom part includes one or more specific purposed semi-permeable membranes (not shown in the figure). Some of the columns have a design of lower tapered sections 313.

As shown in FIG. 1, the engagement of the traditional semi-permeable membrane column 31 with a vacuum manifold 32 is in a tight insertion style: the lower tapered section 313 of the liquid semi-permeable membrane column 31 is inserted into a hole 34 of the vacuum manifold 32 directly or via an insertable adaptor column 33. The insertable adaptor column 33 is used to avoid direct insertion of the semi-permeable membrane column 31 into the hole 34 of the vacuum manifold 32, as the hole 34 of the vacuum manifold 32 may come in contact with the sample contained in the semi-permeable membrane column, and such can lead to cross contamination amongst different samples. The insertable adaptor column 33 can be of a disposable type or can be easily cleaned for repeated use. When the insertable adaptor column 33 is used, the lower tapered section 313 of the semi-permeable membrane column 31 is inserted into the insertable adaptor column 33. Then this ensemble is inserted to the hole 34 of the vacuum manifold 32, and forms the following structure from top to bottom: the semi-permeable membrane column 31—the insertable adaptor column 33—the vacuum manifold 32. Many applications utilize the insertable adaptor column 33, especially experiments which require no cross contamination of the samples, such as using purified nuclear acid for PCR reaction. It is therefore very important that this engagement must be tightly secured to avoid any gas leakage. Often, an operator has to hand-hold the semi-permeable membrane column 31 and the insertable adaptor column 33 to ensure tight engagement. It is likely that the operator may experience discomfort at the fingers due to this maneuver. On the other hand, as can be better understood by referring to FIG. 1, the semi-permeable membrane column 31 remains protruding outwardly from the apparatus during operation, and it is inserted into the hole 34 merely at its tip. Thus, it can easily become disengaged from the hole 34 due to any unintentional collision.

To overcome the above disadvantages, the applicant proposed an invention, which has been allowed as TW 253957. This invention provides an apparatus for processing biological sample, in which a semi-permeable column can be easily placed in the slot of a vacuum manifold. In cases where the liquid to be processed is highly contagious, an adaptor column can be used to avoid cross-contamination and to prevent the operator coming in direct contact with the liquid sample. During operation, the semi-permeable column is placed in the adaptor column, and the adaptor column is placed in the slot of the vacuum manifold. In doing so, the operator can easily operate the apparatus, and even repeated perform the operations without causing pain to the operator's fingers.

According to TW 253957, the semi-permeable column is loosely received in the slot of the vacuum manifold before air pressure or vacuum is applied. If an adaptor column is introduced between the semi-permeable column and the slot of the vacuum manifold, the gaps existing between the two columns and between the adaptor column and the slot will render that the adaptor column is loosely received in the slot and that the semi-permeable column is loosely received in the adaptor column. Due to the gaps, the semi-permeable column and/or the adaptor column can become unstable during operation, and the accuracy of tests will thus be adversely affected.

In view of this, the applicant makes improvement on TW 253957. In the improved apparatus, a seal having the effect of sealing and securing the column in position is provided such that when the semi-permeable column in placed in the slot of the vacuum manifold, air-tight condition can be maintained between the column and the slot, and that the semi-permeable column and the adaptor column will be secured in position without shaking and shifting during operation, and the accuracy of test results can be secured.

SUMMARY OF THE INVENTION

To achieve the above-mentioned objectives, the present invention provides an apparatus for processing biological sample, which comprises at least a semi-permeable column and a vacuum manifold, and optionally comprises at least one adaptor column. The semi-permeable column is loosely received in the slot of the vacuum manifold, or in the adaptor column, and sealing elements made of resilient material are positioned between the semi-permeable column and the slot of vacuum manifold, or between the adaptor column and the slot of vacuum manifold or between the adaptor column and the semi-permeable column, such that when the semi-permeable column in which contains liquid sample is placed in the slot of the vacuum manifold and vacuum is applied to the vacuum manifold, the liquid sample in the semi-permeable column will be pressurized to pass through the semi-permeable membrane to achieve the desired objective.

The semi-permeable column comprises an inner portion, a top portion, and a bottom portion. The inner portion defines a first receiving space; the top portion has a first opening and a radially protruding first flange; the bottom portion has a protruding first outlet and at least one semi-permeable membrane.

The adaptor column is used optionally. It is used particularly when the liquid sample is highly contagious and thus direct contact with the liquid sample and cross-contamination should be avoided. The adaptor column comprises an inner portion, a top portion, and a bottom portion. The inner portion of the adaptor column defines a second receiving space. The top portion has a second opening, and a radially protruding second flange. The bottom portion has a second outlet.

The vacuum manifold comprises a base and a lid. The interior of the base defines a receiving space. The lid comprises at least one slot for receiving at least one semi-permeable column or adaptor column. The bottom of the slot has an opening in communication with the receiving space of the base.

During the operation of the apparatus of the present invention, the semi-permeable column is inserted into the slot of the vacuum manifold. A sealing element, which can be a circular gasket with a central hole, is placed at the bottom of the slot. The central hole allows the protruding outlet of the semi-permeable column to pass through while remaining secured in position to form a sealed contact when the semi-permeable column is inserted into the slot.

In another embodiment, the sealing element is not placed at the bottom of the slot, but instead is placed around the wall of the slot. A circular groove is accordingly formed around the wall of the slot of the vacuum manifold to receive a sealing element, which can be an O-ring. The sealing element will help to secure the semi-permeable column in position and form a sealed contact with the semi-permeable column when the semi-permeable column is inserted into the slot of the vacuum manifold.

In another embodiment, the semi-permeable column can instead be inserted into the adaptor column. The inner diameter of the adaptor column is slightly larger than the outer diameter of the semi-permeable column such that the semi-permeable column can be loosely received in the adaptor column and the first flange of the top portion can rest on the second flange of the adaptor column. The second flange is fitted with a sealing element, which is made of a resilient material and in a ring shape. Another sealing element is provided between the second outlet at the bottom of the adaptor column and the through hole at the bottom of the slot such that when the air pressure in the first receiving space of the semi-permeable column is higher than that of the reservoir space of the vacuum manifold, the first flange of the semi-permeable column will be in a sealed contact with the second flange of the adaptor column, and the bottom of the adaptor column will be in a sealed contact with the bottom of the slot.

In another embodiment, the sealing element is not positioned at the bottom of the slot, but instead is positioned on the wall of the slot. In this scenario, the slot of the vacuum manifold takes a circular groove form on the wall thereof to receive a sealing element, which can be an O-ring. When the adaptor column is inserted into the slot of the vacuum manifold, the sealing element will help to secure the adaptor column in position and form a sealed contact therewith.

To facilitate persons having general knowledge in the art to better understand the technical features of the present invention, and put it into practice, the following descriptions are provided with the accompanied drawings:

DESCRIPTIONS OF THE DRAWINGS

DETAILED DESCRIPTION OF THE EMBODIMENTS

Figure 1:
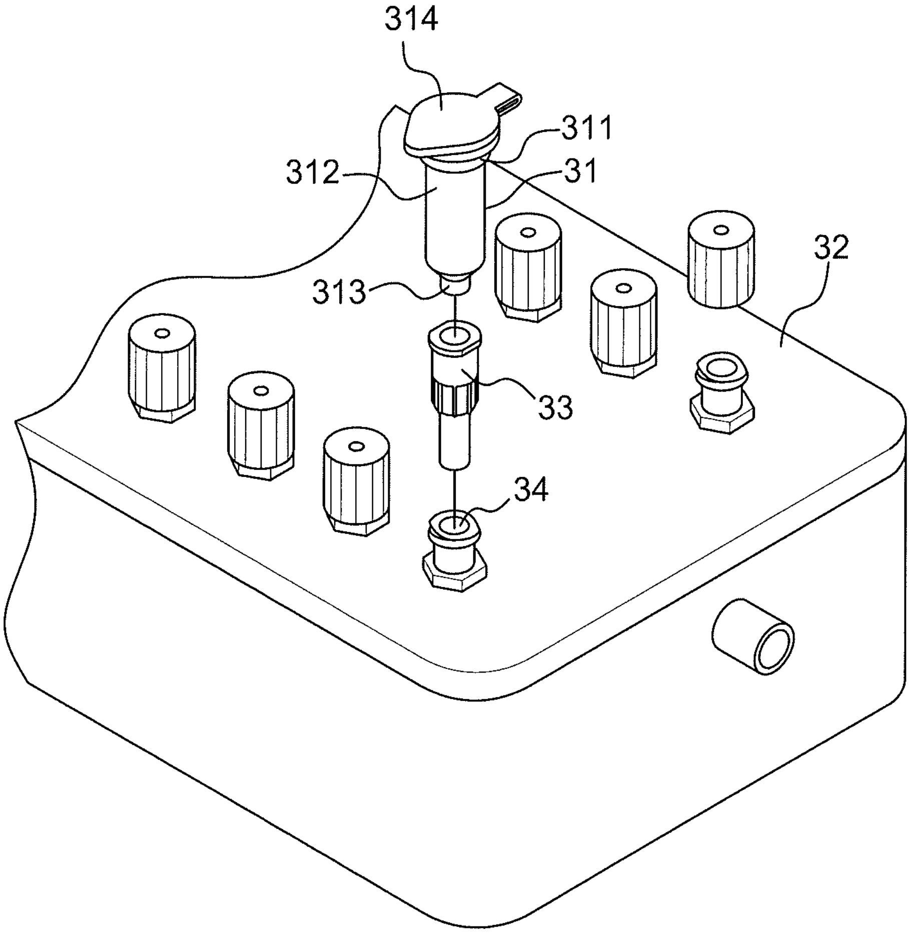
FIG. 1 illustrates a conventional apparatus for processing biological sample.
Figure 2:
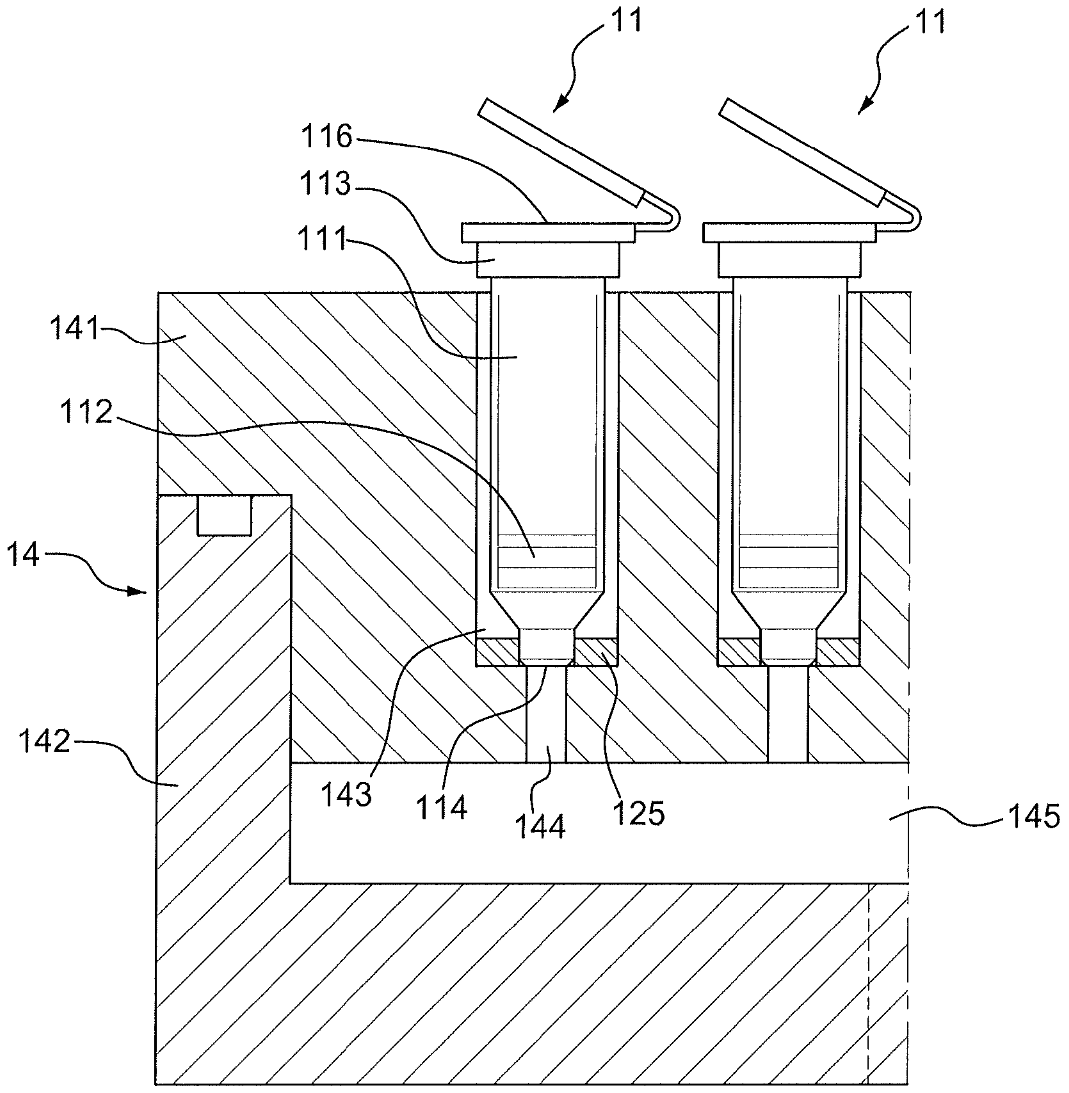
FIG. 2 illustrates a first embodiment of the present invention.

FIG. 2 illustrates a first embodiment of the present invention, wherein the semi-permeable column 11 is a conventional one. Conventional semi-permeable column is generally cylindrical in shape, which comprises an inner portion, a top portion, and a bottom portion. The inner portion defines a first receiving space 111, wherein at least one semi-permeable membrane 112 is placed. The top portion forms a first opening 116 and a first flange 113 extending radially outwardly from the top portion. A first outlet 114 is formed at the bottom portion.

As shown in FIG. 2, a sealing element 125 is positioned at the bottom of the slot 143. The center of the sealing element 125 has an opening. When the semi-permeable column is inserted into the slot 143 of the vacuum manifold 14, the sealing element 125 will allow the first outlet 114 of the semi-permeable column 11 to be inserted through its central opening. Accordingly, the semi-permeable column 11 can be secured in the slot 143 and the first outlet 114 and the sealing element 125 will form a sealed contact. When a vacuum is applied to the receiving space 145 of the vacuum manifold 14, a sealed contact between the slot 143 and the sealing element 125 will be formed and air will be prevented from flowing therebetween. The sealed contacts between the first outlet 114 and the sealing element 125 and between the slot 143 and the sealing element 125 ensure that the liquid sample in the semi-permeable column 11 is forced through only the semi-permeable membrane and out of the column under the atmospheric pressure.

Figure 3:
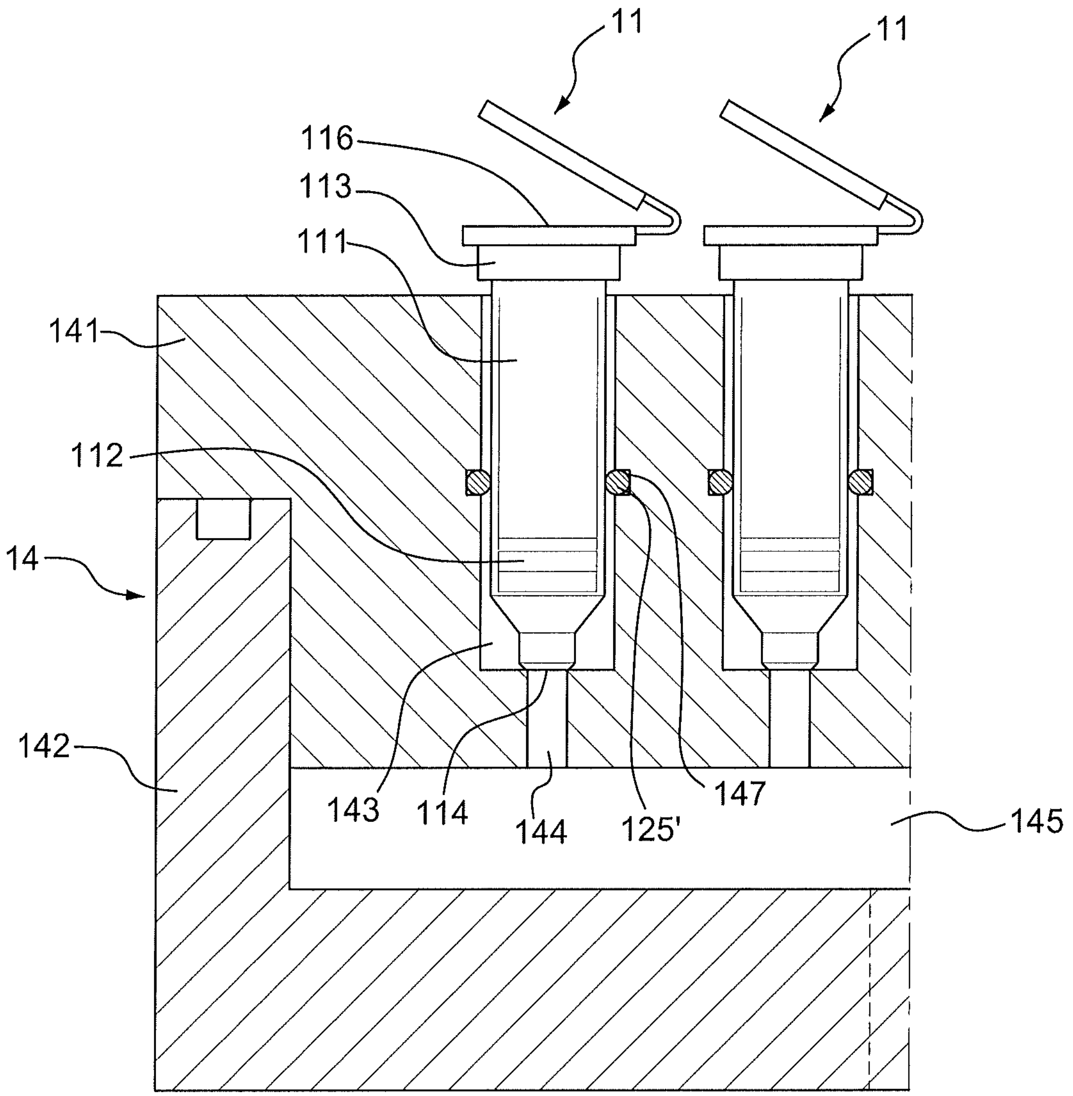
FIG. 3 illustrates a second embodiment of the present invention.

The inventive concept of the present invention is to provide a sealing element such that it not only forms a sealed contact surface but also secures a column in position within the slot of a vacuum manifold. Based on this inventive concept, a sealing element can be also positioned on the wall of the slot 143 (shown in FIG. 3) instead of at the bottom of the slot 143 (shown in FIG. 2). The wall of the slot 143 is provided with a round groove 147 for receiving a sealing element 125', which can be an O-ring. When the semi-permeable column 11 is inserted into the slot 143, the sealing element 125' can guide to secure it in position, and when a vacuum is applied to the receiving space 145 of the vacuum manifold 14, air would not flow through between the semi-permeable column 11 and the sealing element 125'; this ensures that the sample liquid in the semi-permeable column 11 will only be forced through the semi-permeable membrane 112 and out of the column 11 under the atmospheric pressure.

Figure 4:
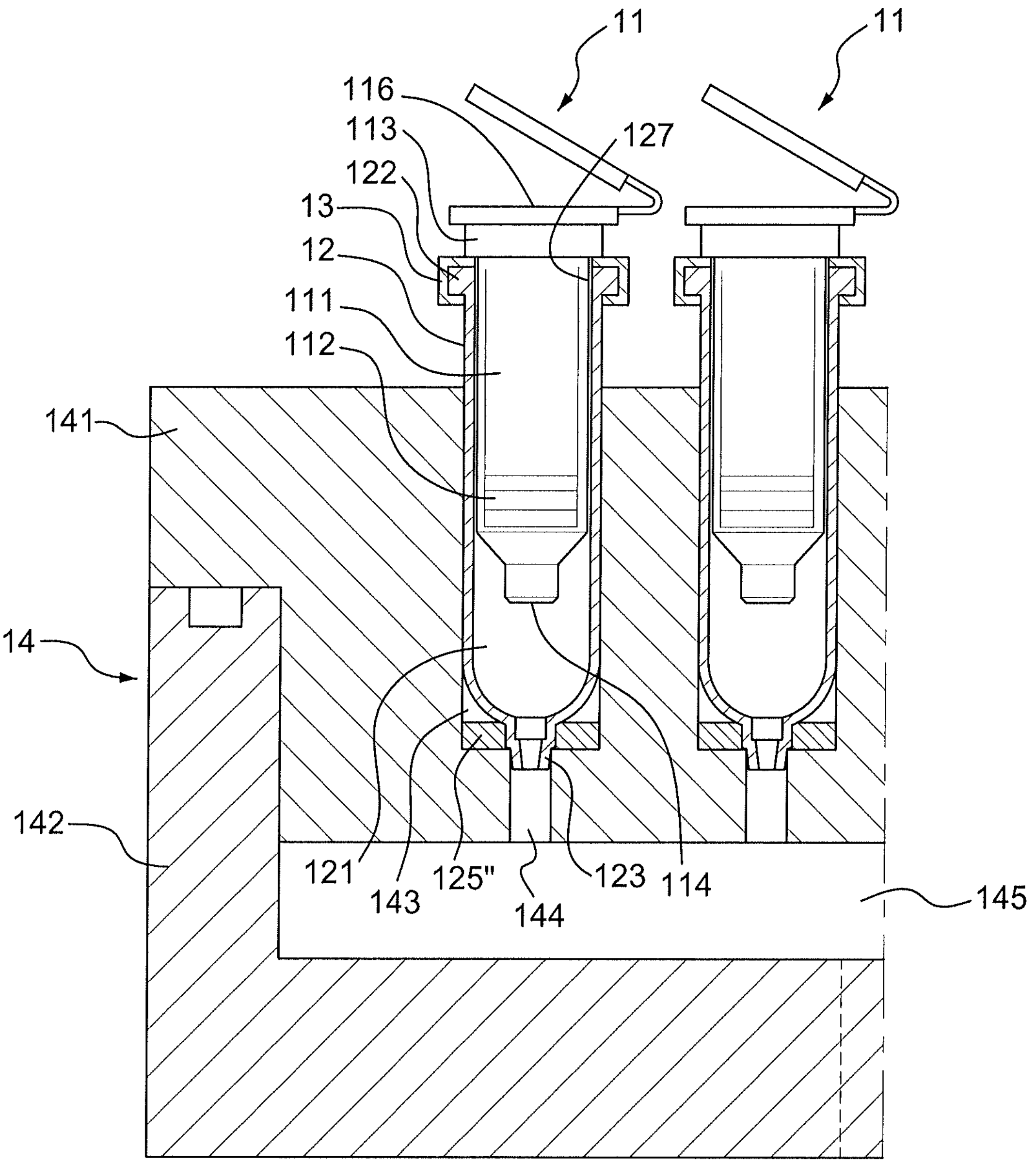
FIG. 4 illustrates a third embodiment of the present invention.

When the sample is highly contagious, an adaptor column 12 can be used and it is inserted between the semi-permeable column 11 and the slot 143, as shown in FIG. 4, to avoid cross-contamination of the sample liquid.

The adaptor column 12 generally has the shape of a column, and can be made of any appropriate materials. The adaptor column 12 comprises an inner portion, a top portion, and a bottom portion. The inner portion defines a second receiving space 121. The top portion has a second opening 127 and a second flange 122 extending radially and outwardly from the top portion. The flange 122 is fitted a resilient sealing element 13 around the circumference thereof. The bottom portion has a second outlet 123. The inner diameter of the adaptor column 12 is slightly larger than the outer diameter of the body of the semi-permeable column 11, but smaller than the diameter of the first flange 113 of the semi-permeable column 11 such that the semi-permeable column 11 can be inserted into the adaptor column 12 and be loosely received in the second receiving space 121 of the adaptor column 12 and that the first flange 113 of the top portion of the semi-permeable column 11 can rest on the sealing element 13.

FIG. 4 shows a third embodiment of the present invention. With respect to the first embodiment, the third embodiment further includes an adaptor column 12. A sealing element 13 fits around the circumference of the second flange 122 of the adaptor column 12. The sealing element 13 is preferably a resilient ring. When a semi-permeable column containing sample liquid is positioned in the adaptor column 12 and the adaptor column 12 is positioned in the slot 143 of the vacuum manifold 14, when applying a vacuum to the vacuum manifold 14 until the pressure in the first receiving space 111 of the semi-permeable column 11 is greater than that of the receiving space 145 of the vacuum manifold 14, the first flange 113 of the semi-permeable column 11 and the sealing element 13 around the second flange 122 of the adaptor column 12 will be in a sealed contact. In this scenario, the atmospheric pressure exerting on the sample liquid in the semi-permeable column 11 will force the sample liquid to flow out of the column 11. Apart from the loosely received and air-sealed features, the adaptor column 12 has a primary function of preventing direct contact between the slot 143 of the vacuum manifold 14 and the semi-permeable column 11 in order to eliminate cross-contamination resulting from repeated use of the semi-permeable column.

Figure 5:
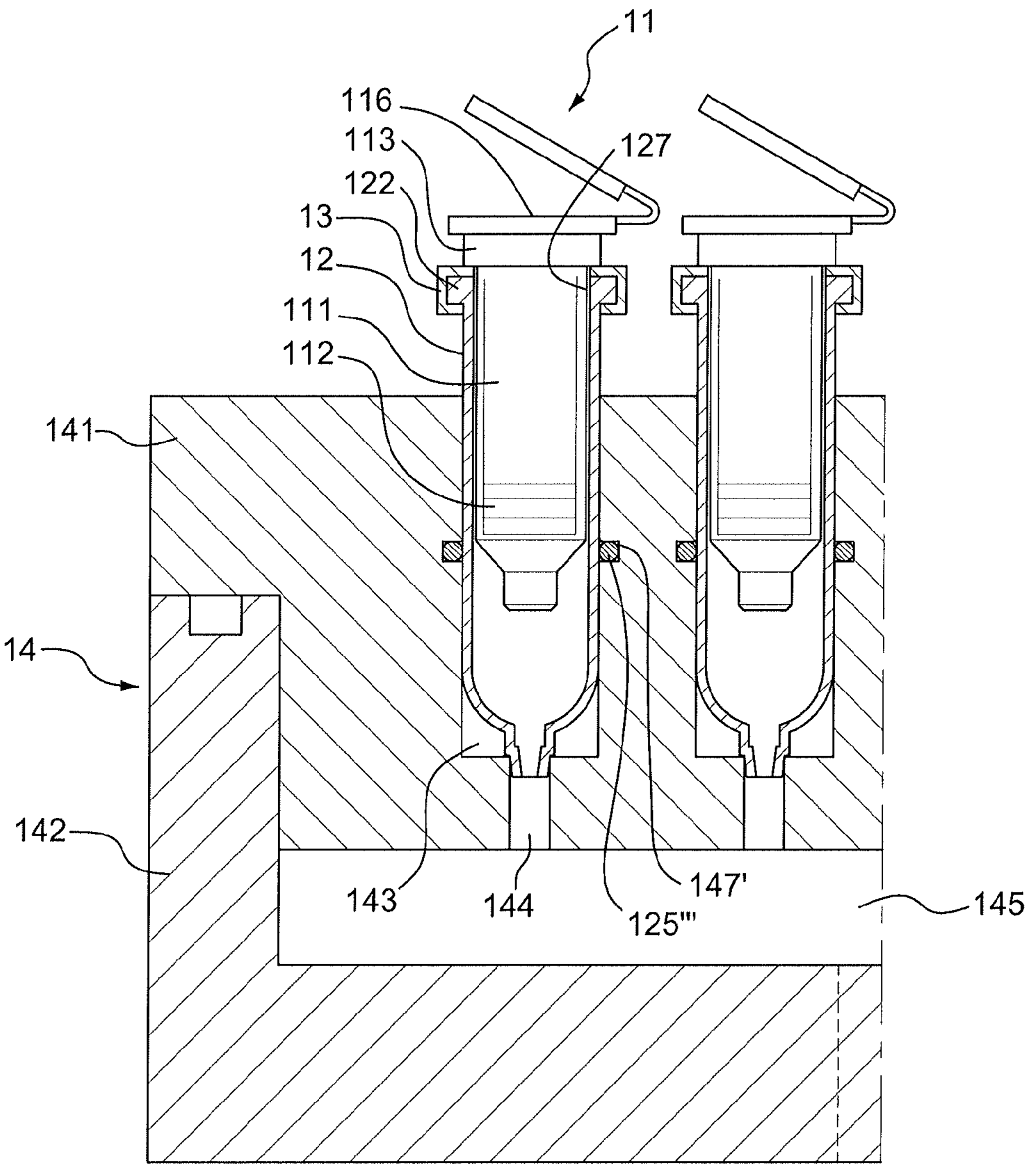
FIG. 5 illustrates a fourth embodiment of the present invention.

The sealing element 125" in the third embodiment shown in FIG. 4 does not necessarily need to be positioned at the bottom of the slot 143. In the fourth embodiment shown in FIG. 5, the slot 143, similar to that of the second embodiment, has a circular groove 147' formed on the wall thereof. An O-ring shape sealing element 125'" is fitted to the circular groove 147'. When the adaptor column 12 is positioned into the slot 143, the sealing element 125'" can secure the adaptor column 12 in position. When vacuum is applied to the receiving space 145 of the vacuum manifold 14, air will not pass through between the adaptor column 12 and the sealing element 125'" nor between the first flange 113 of the semi-permeable column 11 and the sealing element 13, and thus the liquid sample in the semi-permeable column 11 will only be forced through the semi-permeable membrane 112 and out of the column under the atmospheric pressure.

In summary, the objectives of the present invention are to provide an easily assembled and disassembled apparatus for processing biological samples, to stably secure the columns in position, and to eliminate the disadvantages existing in the conventional apparatus. Since the semi-permeable column or the adaptor column has the advantage of easy insertion into and removal from the slot, the apparatus of the present invention can be used in automatic operation by robot when moving the columns is required.

The invention may also be implemented in other specific ways without departing from the spirit and the essence of the invention. Thus, the above-mentioned embodiments should be regarded as explanatory and not restrictive. All changes that remain consistent with the scope of the claims and its equivalents should be deemed as falling within the scope claimed by the invention.

What is claimed is:

1. An apparatus for securely processing biological sample, comprising:

at least one semi-permeable column, whereby the inner portion of which defines a first receiving space, the bottom of the first receiving space has at least one semi-permeable membrane, the top portion of the semi-permeable column has a first opening and a flange extending radially and outwardly from the first opening, and the bottom of the semi-permeable column has a first outlet;

at least one adaptor column, whereby the interior of which defines a second receiving space, the top portion of which has a second opening and a second flange extending radially and outwardly from the second opening, the bottom portion of which has a second outlet protruding downwardly, the diameter of the second receiving space is merely slightly larger than the outer diameter of the semi-permeable column thereby allowing the semi-permeable column to be secured stably during operation, the second flange having a second sealing element fitting therearound such that when the semi-permeable is inserted into the adaptor column, the first flange will rest on the second sealing element;

a vacuum manifold, comprising:

a base, the interior of which defines a receiving space; and a lid covering the base, comprising at least one slot, whereby the internal diameter of which is merely slightly larger than the outer diameter of the adaptor column thereby allowing the adaptor column to be secured stably during operation, and the slot forms a through hole at the bottom thereof for communicating with the receiving space of the base;

at least one sealing element positioned around the adaptor column and in the gap formed between the slot and the adaptor column such that when the adaptor column is inserted into the slot, it can be secured in position, and when vacuum is applied to the vacuum manifold, air would not pass through between the adaptor column and the sealing element, nor through between the first flange and the second sealing element.

* * * * *